United States Patent
Bouiller et al.

[11] Patent Number: 6,164,563
[45] Date of Patent: Dec. 26, 2000

[54] CONVERGING EXHAUST NOZZLE FITTED WITH TRANSLATING COLD FLAPS

[75] Inventors: Philippe Pierre Vincent Bouiller, Samoreau; Pierre-Yves Bourquin, Paris; Fabrice Michel Olivier Cot, Savigny le Temple; Daniel Kettler, Chartrettes; Jean-Pierre Ruis, Le Chatelet en Brie, all of France

[73] Assignee: Societe Nationale d'Etude et de Construction de Moteurs d'Aviation "Snecma", Paris, France

[21] Appl. No.: 09/356,321

[22] Filed: Jul. 16, 1999

[30] Foreign Application Priority Data

Jul. 17, 1998 [FR] France ................... 98 09128

[51] Int. Cl.[7] .................................................. B05B 12/00
[52] U.S. Cl. ........................... 239/265.37; 60/271
[58] Field of Search ................ 60/271; 239/265.19, 239/265.33, 265.37, 265.39

[56] References Cited

U.S. PATENT DOCUMENTS

| | | |
|---|---|---|
| 4,641,782 | 2/1987 | Woodward . |
| 4,878,617 | 11/1989 | Novotny . |
| 4,993,641 | 2/1991 | Kehret et al. . |
| 5,934,564 | 8/1999 | Bouiller et al. ............ 239/265.37 |

FOREIGN PATENT DOCUMENTS

| | | |
|---|---|---|
| 1 479 351 | 5/1967 | France . |
| 2 602 274 | 2/1988 | France . |
| 2 740 833 | 5/1997 | France . |

*Primary Examiner*—Timothy S. Thorpe
*Assistant Examiner*—Ehud Gartenberg
*Attorney, Agent, or Firm*—Bacon & Thomas, PLLC

[57] ABSTRACT

A gas-flow exhaust assembly for a jet propulsion system of an aircraft in which a converging exhaust nozzle (4) is fitted with translating cold flaps (21, 22). The primary exhaust nozzle (4) comprises two hot-flaps (5, 6) situated beyond a primary duct (1) enclosed by an aircraft fairing (2). The fairing (2) is extended by a secondary exhaust nozzle (20) which is supported by the primary duct (1) and which is translatable by a control mechanism (27a, 27b). The secondary exhaust nozzle (20) comprises cold flaps (21, 22) which are driven by another control mechanism (29a, 29b) independently of the angular positions of the hot flaps (5, 6). Preferably, there are two eyelid-shaped cold-flaps (21, 22) hinging and supported on horizontal transverse shafts (23a, 23b). The shafts (23a, 23b) are preferably affixed on two lateral slides (24a, 24b) which slide on the primary duct (1) and are displaceable by the control mechanism (27a, 27b) which translates the secondary exhaust nozzle (20).

21 Claims, 7 Drawing Sheets

CONVERGING EXHAUST NOZZLE FITTED WITH TRANSLATING COLD FLAPS

BACKGROUND OF THE INVENTION

1. Field of the Invention

The present invention relates to a gas-flow exhaust assembly for a jet propulsion system of an aircraft. More specifically, it relates to an exhaust assembly comprising a primary duct through which a primary gas flow passes during operation of the jet propulsion system and which terminates in a converging, primary exhaust nozzle at a downstream end thereof. The primary exhaust nozzle comprises two half-clamshells constituting hot flaps which hinge on horizontal transverse shafts. The primary exhaust nozzle transitions in shape from a nozzle intake cross-section matching the primary duct to a nozzle exhaust cross-section having a substantially elliptical or rectangular overall shape. A first control mechanism is arranged to drive the hot flaps. The primary exhaust nozzle is also fitted with a fairing which forms a rear end of the aircraft and encloses the primary duct.

2. Description of the Related Art

Such an exhaust assembly is described in French patent 2,740,833. The convergent primary exhaust nozzle allows flattening of the jet of hot gases at the engine exhaust to reduce the infrared signature.

In French patent 2,740,833, the fairing forming the rear end of the aircraft extends rearward beyond the outlet of the primary exhaust nozzle and assures aerodynamic continuity of the aircraft. This stationary fairing is in the form of a converging/diverging secondary exhaust nozzle of fixed cross-section.

Presently missiles, in particular those guided by infrared and radars, used on military aircraft have become increasingly perfected with respect to detection, guidance and destructiveness.

This increasing sophistication in missile and radar design therefore demands that aircraft and engine designers for the armed forces provide not only high-performance products, but also products having high manoeuverability and stealth. The stealth requirement demands further reduction of the engine's infrared signature.

SUMMARY OF THE INVENTION

The objective of the invention is to modify the aircraft exhaust assembly which is fitted with hot flaps as described in the French patent 2,740,833 in order to further reduce the engine's infrared signature.

The inventive exhaust assembly furthermore comprises a secondary exhaust nozzle downstream of the fairing and supported on the primary exhaust nozzle. The secondary exhaust nozzle is translatable by a second control mechanism. The secondary exhaust nozzle comprises cold flaps driven by a third control mechanism independently of the angular positions of the hot flaps.

The secondary exhaust nozzle may assume two translational positions. In a forward position, the cold flaps are situated as an extension of the aircraft fairing and ensure aerodynamic aircraft continuity. In a rearward position, the cold flaps mask to a larger extent the hot jet exhaust issuing from the primary exhaust nozzle and the hot flaps. Selection between these two positions depends on the aircraft mission.

Preferably the secondary exhaust nozzle comprises two eyelid-like cold-flaps hinging and supported on secondary horizontal transverse shafts. The secondary shafts are affixed to two lateral slides which slide on the primary duct and which are displaced by the second control mechanism.

These slides are preferably guided on rollers rigidly affixed to the primary duct. The second control mechanism may comprise telescoping linear actuators anchored on the primary duct and arranged to drive the slides.

The secondary exhaust nozzle may furthermore comprise an annular shell supported on the slides and movable between a retracted position inside the aircraft fairing and an extended position at least partially outside of the fairing as a function of an actuation of the second control mechanism. This annular shell may support the third control mechanism. The third control mechanism may comprise linear actuators anchored on the annular shell and arranged to drive the cold flaps.

Advantageously, the primary exhaust nozzle may also comprise ventilated lateral plates.

BRIEF DESCRIPTION OF THE DRAWINGS

Other advantages and features of the invention are elucidated in the following description of a non-limiting, illustrative embodiment, with reference to the attached drawings, in which.

DETAILED DESCRIPTION OF THE PREFERRED EMBODIMENT

Reference 1 denotes an afterburner conduit forming a primary duct through which pass the hot gases exhausted from the jet propulsion system. The primary duct is situated within a fairing 2 at the rear of the aircraft. The primary duct 1 and the fairing 2 bound between them an auxiliary passage 2a to pass a secondary gas flow cooling the primary duct 1. The fairing 2 runs approximately as far as a plane 3 of an outlet of the primary duct 1.

A converging primary exhaust nozzle 4 is mounted at the downstream end of the primary duct 1. This primary exhaust nozzle 4 comprises two hot flaps 5 and 6 which form a substantially elliptical or even rectangular cross-section at the outlet 7 of the primary exhaust nozzle 4. The flaps 5, 6 are in the form of half-clamshells which hinge on two transverse, horizontal shafts 8a, 8b of the primary duct 1. The half-clamshells transition in shape between a circular intake cross-section of the primary exhaust nozzle 4 at the upstream side, which matches the shape of the downstream end of the primary duct 1, and the elliptical, rectangular or the like shape of the exhaust cross-section 7.

In order to avoid a lateral bursting of the hot gases, the primary exhaust nozzle 4 may further comprise two ventilated lateral plates 9a, 9b affixed to the primary duct 1.

Figure 5:
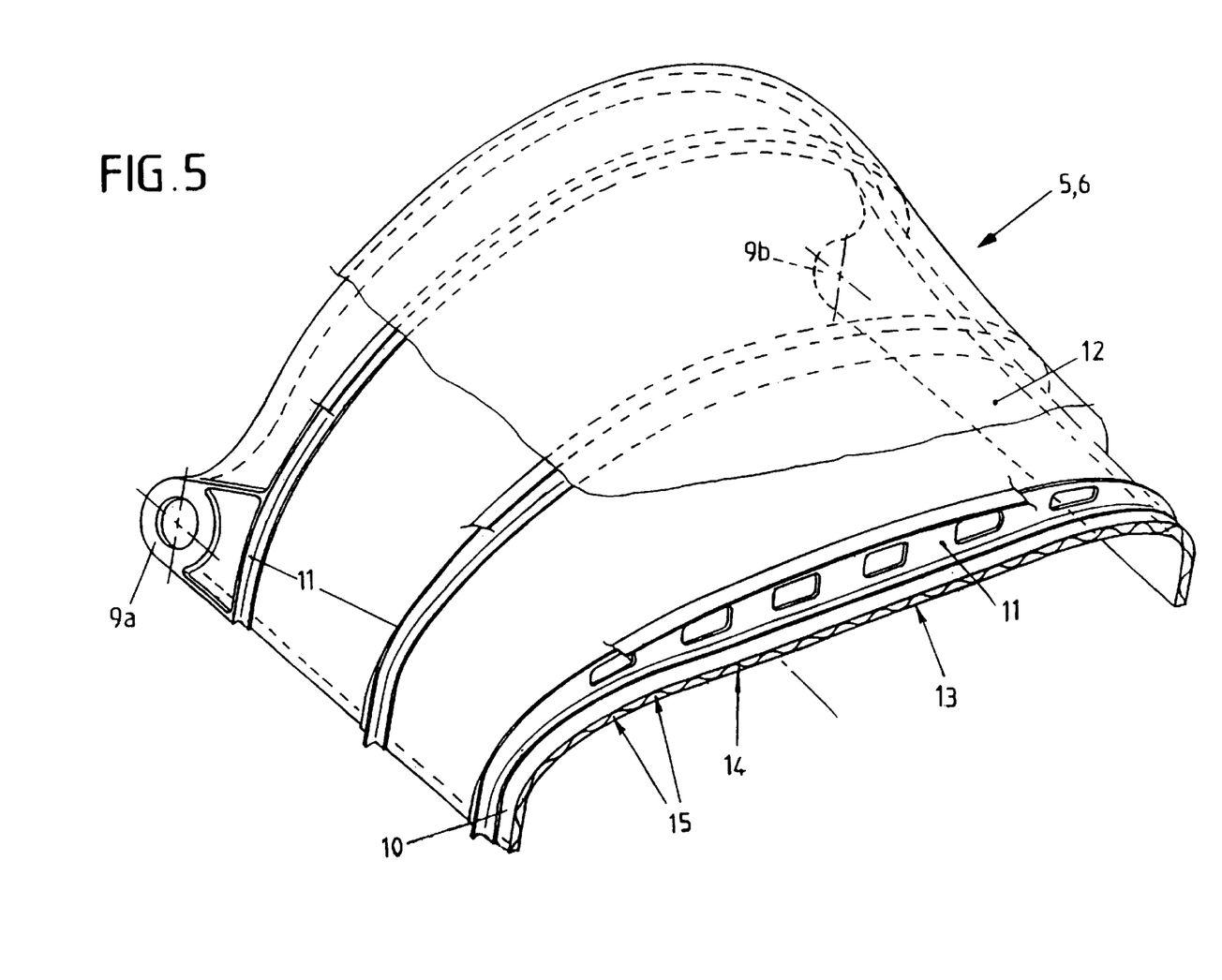
FIG. 5 is a partly cutaway perspective view of a hot flap of the exhaust assembly of the invention.
Figures 6, 7:
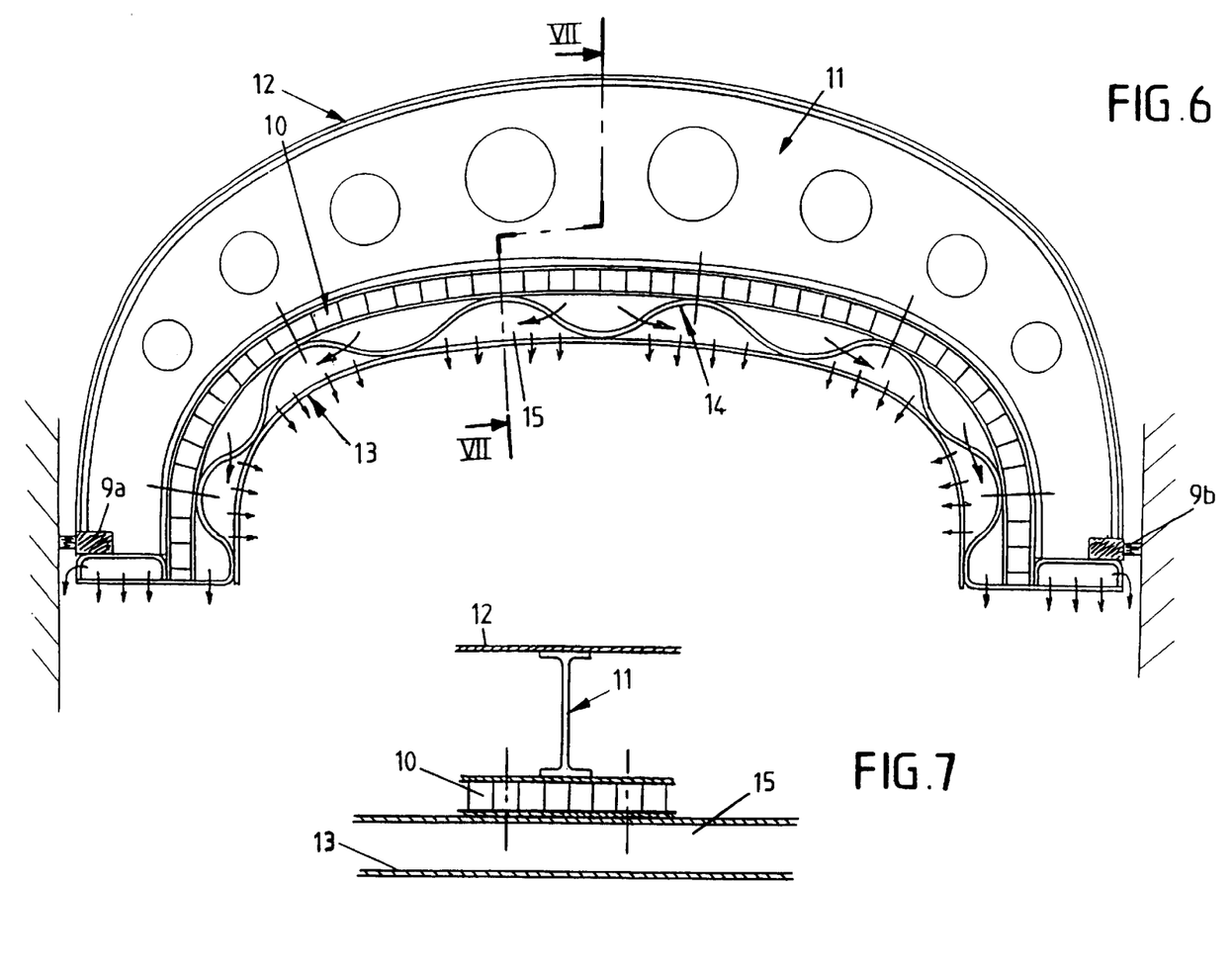
FIG. 6 is a cross-section view of the hot flap of FIG. 5.
FIG. 7 is a section view taken along line VII—VII of FIG. 6.
Figure 8:
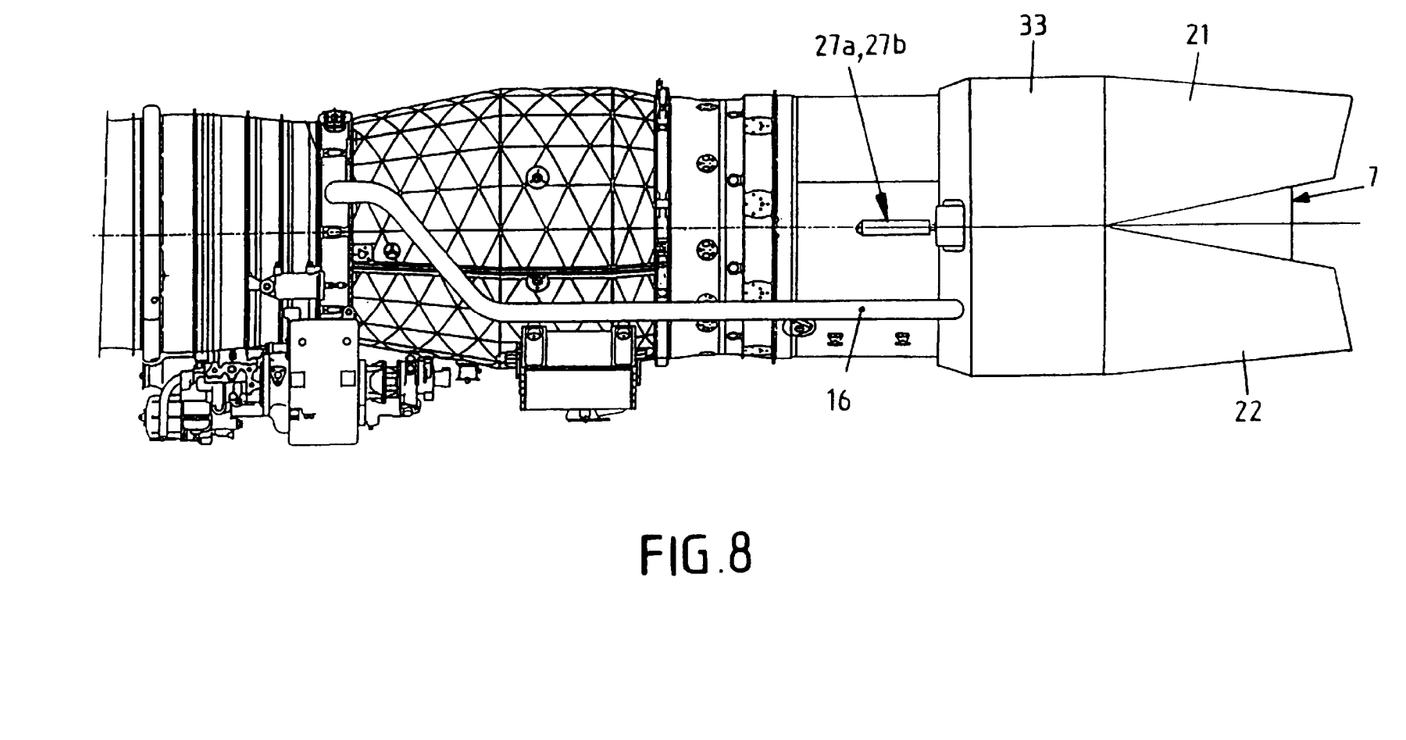
FIG. 8 is a side view of a turbojet engine fitted with the exhaust assembly of the invention.

Each of the two hot flaps 5, 6 of this primary exhaust nozzle 4 may be a titanium structure comprising a honeycomb inner wall 10 reinforced by a rib 11 and a nondescript outer skin 12. This structure is preferably thermally protected by a semi-sandwich refractory material of the KCN22W-type commercially known as HA188. It includes a permeable Lamilloy-type skin 13, or a perforated skin, and a corrugated core 14, which together constitute a plurality of venting conduits 15 of the hot flaps 5, 6. The corrugated core 14 also allows the thermally insulating skin 13 to be affixed onto the structure of the corresponding flap.

The hot flaps 5, 6 and the lateral plates 9a, 9b of the primary exhaust nozzle 4 are vented by a fresh, bypass flow from the engine. Conduits 16 move this fresh air to a structural collector 17. This structural collector 17 contributes to the mechanical strength of the primary duct 1 and supports the constituents of the primary exhaust nozzle 4, that is the lateral plates 9a, 9b, the shafts 8a, 8b and the two hot flaps 5, 6.

Regarding the position control of the primary exhaust nozzle 4, each hot flap 5, 6 is preferably driven by two single-acting linear actuators 18a, 18b anchored on the primary duct 1.

A secondary exhaust nozzle 20 enclosing the primary exhaust nozzle 4 is substantially located downstream of the aircraft fairing 2. This secondary exhaust nozzle 20 is convergent and comprises two cold flaps 21, 22 which are eyelid-shaped and which hinge and are supported on two secondary horizontal transverse shafts 23a, 23b. These secondary shafts 23a, 23b are affixed to two lateral slides 24a, 24b which are guided on rollers 25 rigidly joined to the primary duct 1. The two lateral slides 24a, 24b may be shifted parallel to the longitudinal axis 26 of the primary duct 1 by two telescoping linear actuators 27a, 27b anchored on the primary duct 1.

Figure 1:
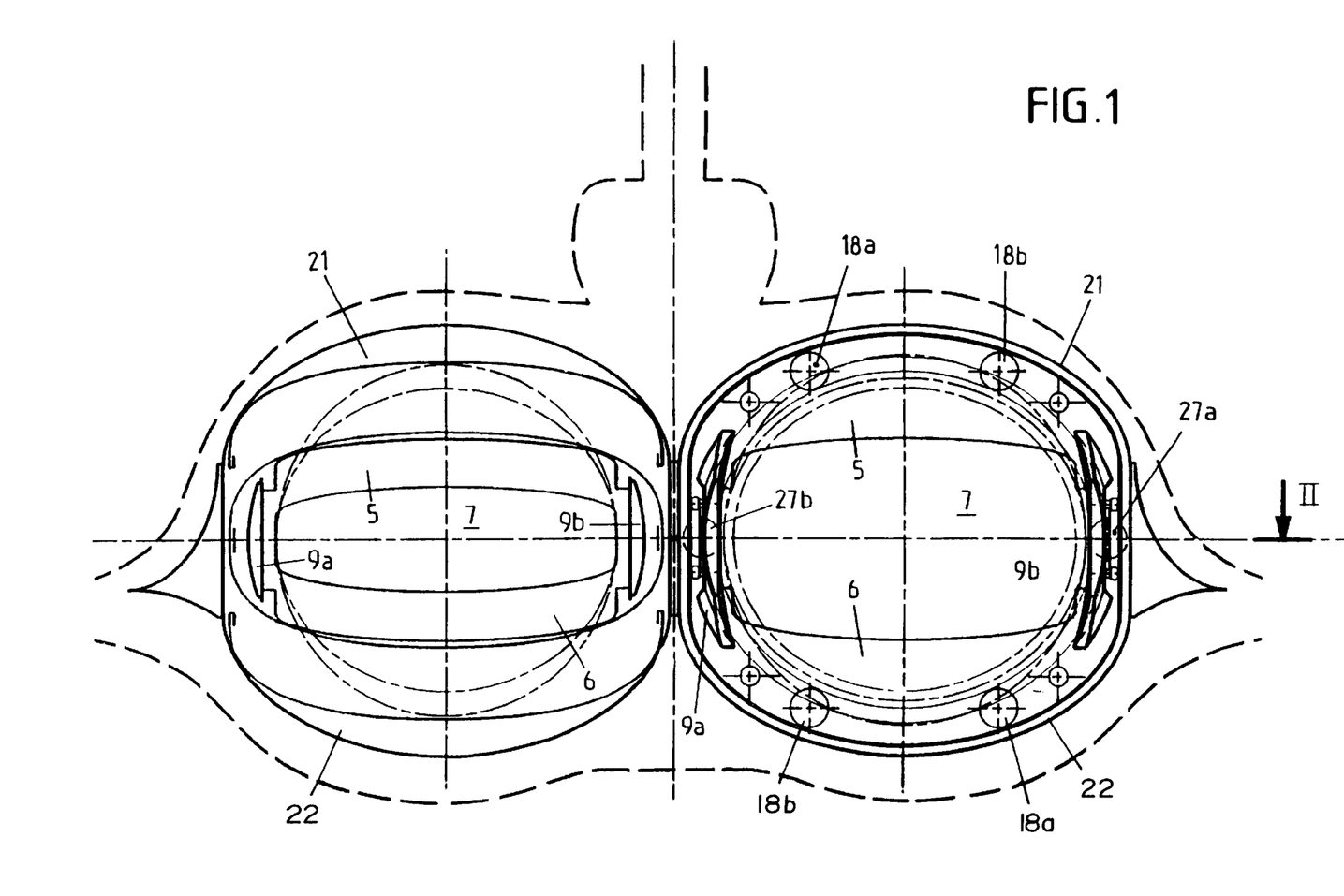
FIG. 1 is a partial rear view of a twin-jet aircraft having engines fitted with an exhaust assembly of the invention, the left half showing both the primary exhaust nozzle and the secondary exhaust nozzle in a maximally closed position to reduce the infrared signature, and the right half showing the primary and the secondary exhaust nozzles in a maximally open position.
Figure 2:
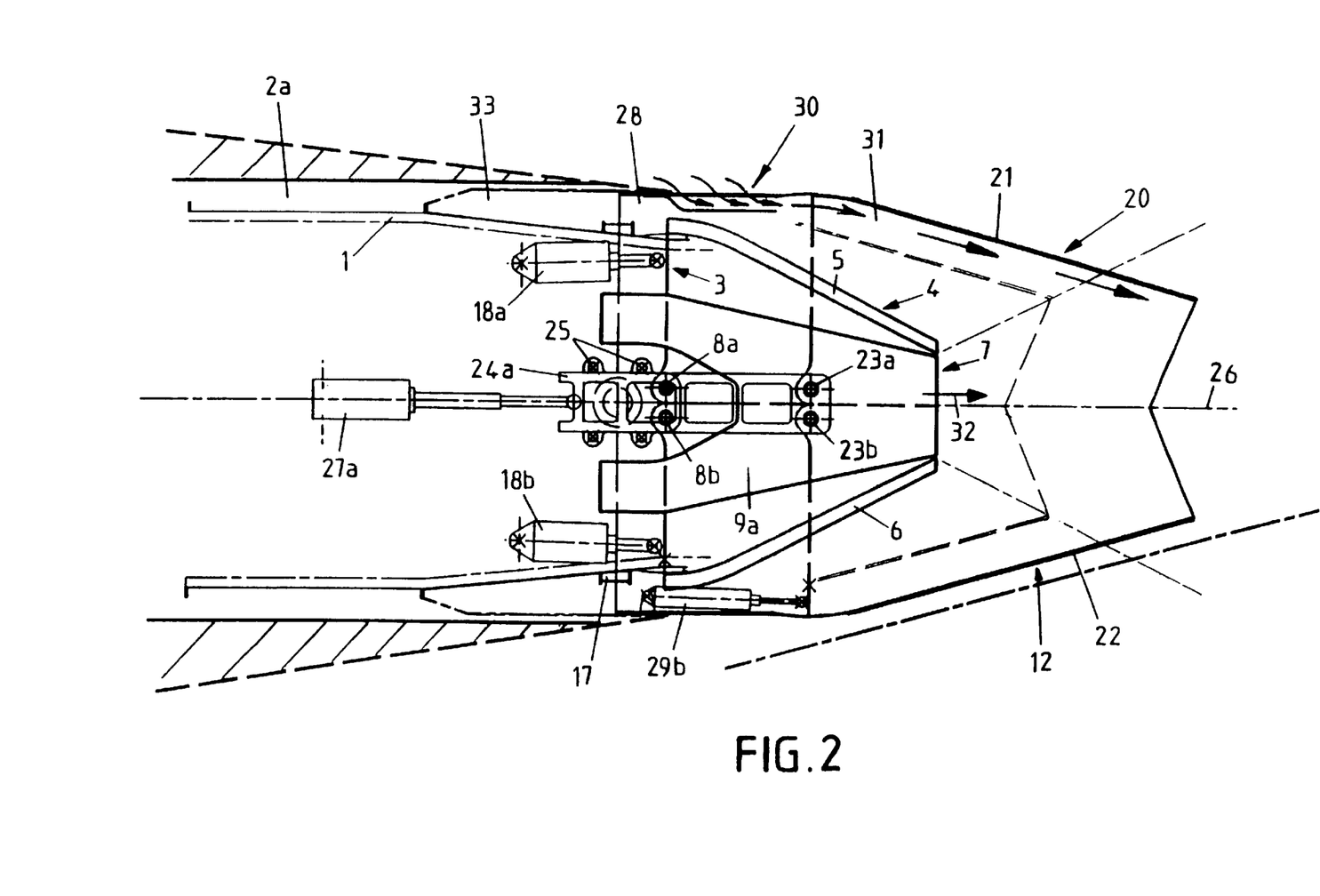
FIG. 2 is an axial section view taken in a vertical plane of the exhaust assembly of the invention, the cold flaps being maximally closed and masking the hot flaps.
Figure 3:
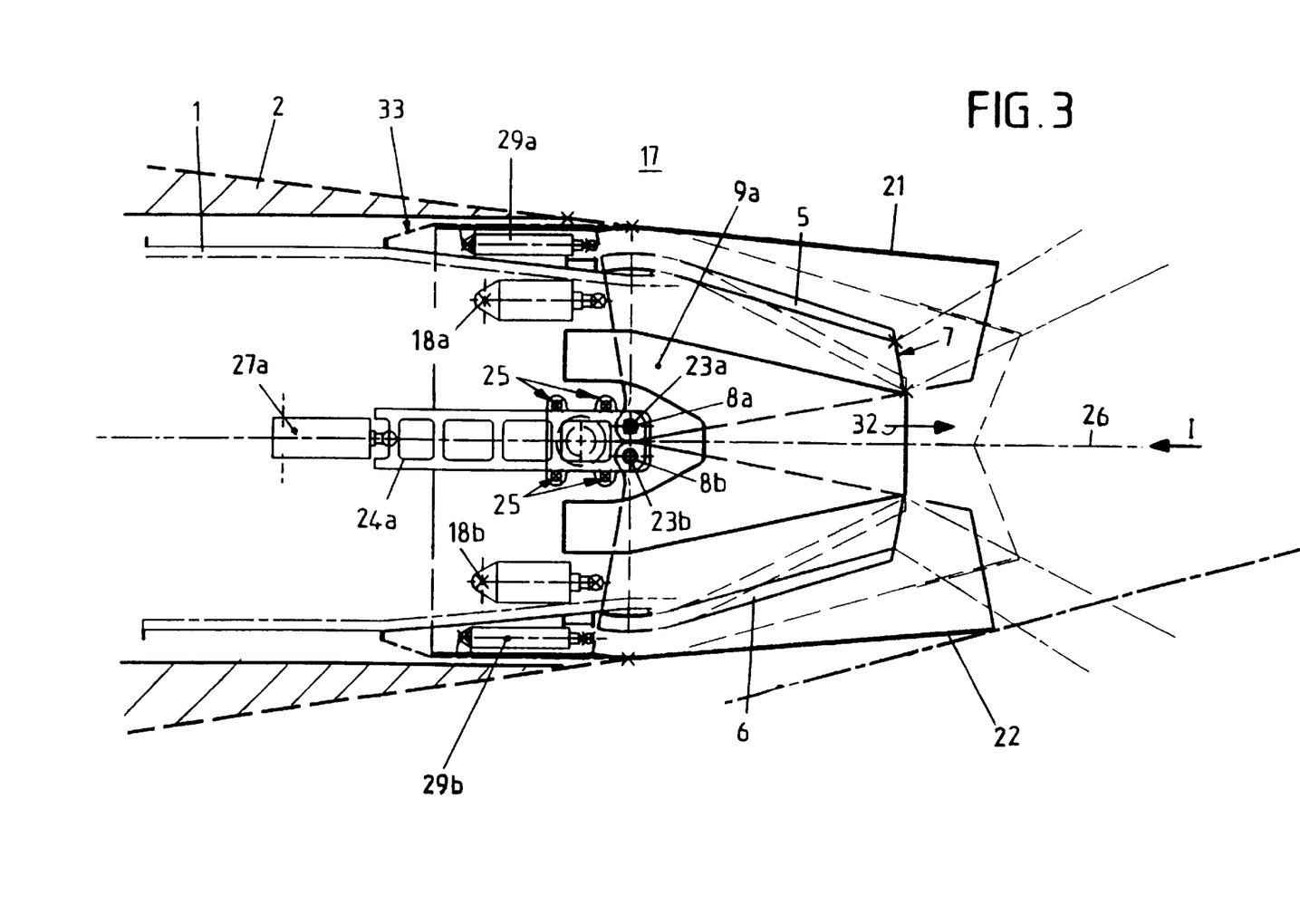
FIG. 3 is an axial section view taken in a vertical plane of the exhaust assembly of the invention, the secondary exhaust nozzle being maximally opened.
Figure 4:
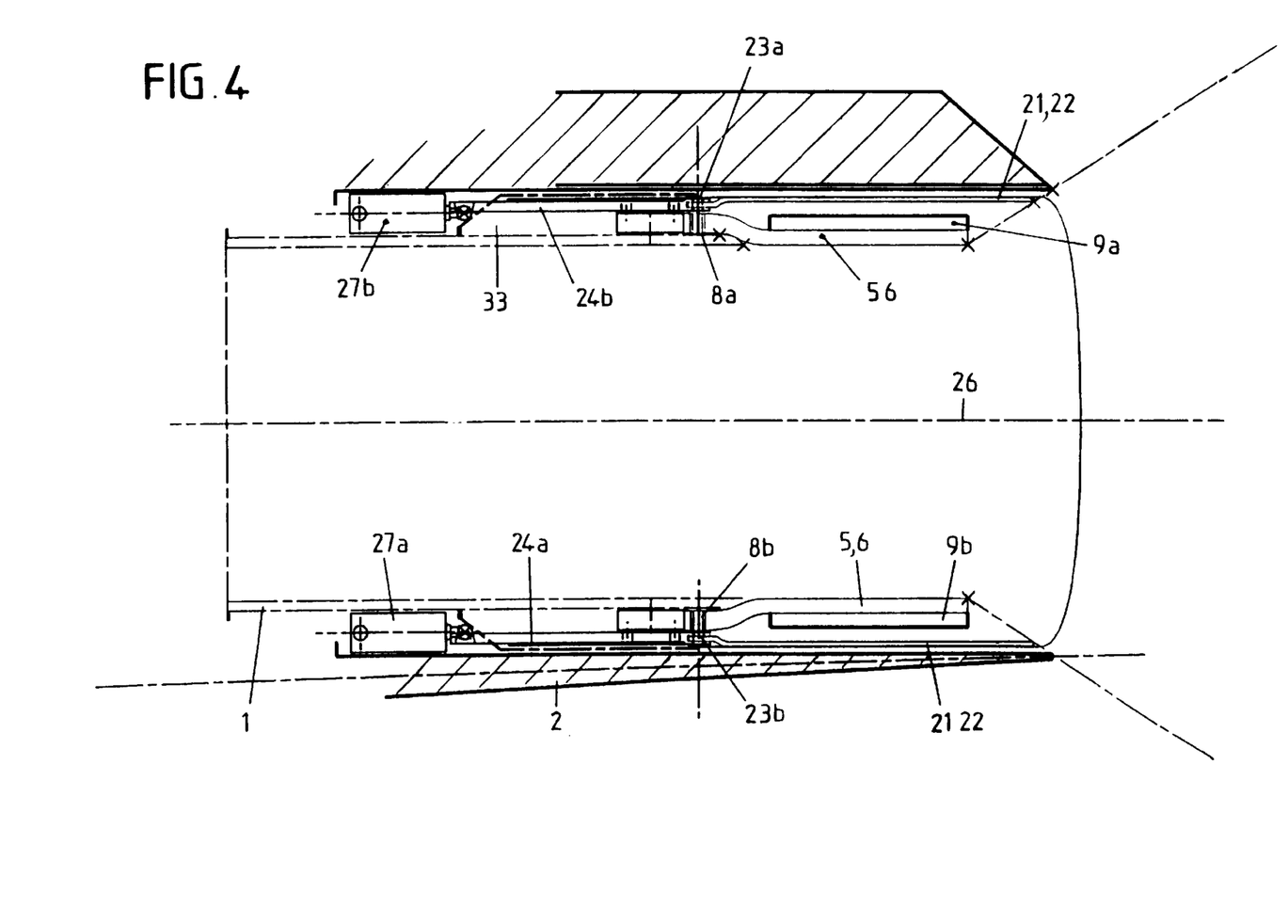
FIG. 4 is a section view taken in a horizontal plane of the exhaust assembly of the invention.

The two lateral slides 24a, 24b support an annular shell 28 which encloses the primary duct 1. The annular shell 28 is movable between a retracted position (FIG. 3) in the aircraft fairing 2 and an extended position (FIG. 2) wherein the annular shell 28 is situated in the extension of the fairing 2 and the cold flaps 21, 22 are situated downstream of the fairing 2.

Linear control actuators 29a, 29b anchored on the annular shell 28 are arranged to pivot the cold flaps 21, 22 about the secondary shafts 23a, 23b on the slides 24a, 24b independently of the angular positions of the hot flaps 5, 6.

When the annular shell 28 assumes its rearmost position, the cold flaps 21, 22 form a cowling which masks the hot flaps 5, 6.

Advantageously, the annular shell 28 comprises one or more scoops 30 arranged to guide a cold, external air flow 31 into the secondary exhaust nozzle 20. This cold external air flow 31 ventilates the cold flaps 21, 22 by cooling their inside surfaces and is mixed with the hot gas jet 32 leaving the primary exhaust nozzle 4 to lower the temperature of the hot gas jet 32 and thereby to reduce the infrared signature.

This scooping procedure is possible only when the cold flaps 21, 22 are in their rearmost positions.

The external shape of the cold flaps 21, 22 is constrained by the shape of the aircraft's rear fuselage. A stationary annular shell 33 mounted inside the auxiliary passage 2a forms the interface of the displaceable annular shell 28 and the aircraft fairing 2.

Regarding the control mechanisms, synchronized control of the displacements of the various linear actuators is preferably implemented by servo-valves cooperating with position sensors.

The proposed exhaust assembly offers many advantages relating to the infrared signature and the aerodynamic aircraft drag.

As regards the infrared signature, multi-directional masking of the exhaust jet is implemented by the cold flaps 21, 22 in their rear positions. Selection of either the forward or the rear position of the cold flaps 21, 22 is made depending on the aircraft's missions. When in their rear positions, the cold flaps 21, 22 reduce the infrared signature masking the hot flaps 5, 6 and by scooping the cold external air.

As regards the aircraft's aerodynamic drag, the separate and independent control of the cold flaps 21, 22 and the hot flaps 5, 6 allows optimization of the aircraft drag because, when in supersonic flight, the cold flaps 21, 22 may be left in the forward position which assures aerodynamic continuity with the rear of the aircraft. In this manner a shockwave is avoided at the junction of the rear of the aircraft and the cold flaps 21,22. The thrust may be vectored along the pitch axis by appropriately regulating the linear actuators.

What is claimed is:

1. A gas-flow exhaust assembly for a jet power plant of an aircraft, the exhaust assembly comprising:

a primary duct (1) through which a primary gas flow (32) passes during operation of the jet power plant;

a primary convergent exhaust nozzle (4) terminating said primary duct (1) at a downstream end thereof and exhausting said primary gas flow (32), said primary exhaust nozzle (4) comprising two half-clamshells (5, 6) constituting a pair of hot flaps, each of said half-clamshells (5, 6) hinging on one of a pair of primary transverse shafts (8a, 8b) and transitioning in shape from an exhaust-nozzle inlet cross-section matching said primary duct (1) to an exhaust-nozzle outlet cross-section (7) having a substantially elliptical or rectangular overall shape;

a first control mechanism (18a, 18b) arranged to drive said hot flaps pivotally about said primary transverse shafts (8a, 8b);

a fairing (2) comprising a rear end of the aircraft and enclosing at least a downstream portion of said primary duct (1);

a secondary exhaust nozzle (20) downstream of said primary exhaust nozzle (4), said secondary exhaust nozzle (20) being supported by said primary duct (1) and being translationally displaceable with respect thereto, said secondary exhaust nozzle (20) comprising a pair of pivotable cold flaps (21, 22);

a second control mechanism (27a, 27b) arranged to drive said secondary exhaust nozzle (20) translationally with respect to said primary duct (1); and a third control mechanism (29a, 29b) arranged to drive said cold flaps (21, 22) pivotally independently of said hot flaps (5, 6).

2. An exhaust assembly according to claim 1, further comprising:

a pair of lateral slides (24a, 24b) slidably mounted on said primary duct (1) and displaceable by said second control mechanism (27a, 27b); and a pair of secondary transverse shafts (23a, 23b), each one of said secondary transverse shafts (23a, 23b) respectively having one of said cold flaps (21, 22) hinged and supported thereon, said secondary transverse shafts (23a, 23b) being affixed to said lateral slides (24a, 24b).

3. An exhaust assembly according to claim 2, further comprising:

rollers (25) rigidly joined to the primary duct (1), said lateral slides (24a, 24b) being guided on said rollers (25).

4. An exhaust assembly according to claim 2, wherein said second control mechanism (27a, 27b) comprises at least one telescoping linear actuator which is anchored on said primary duct (1) and arranged to drive said lateral slides (24a, 24b).

5. An exhaust assembly according to claim 3, wherein said second control mechanism (27a, 27b) comprises at least one telescoping linear actuator which is anchored on said primary duct (1) and arranged to drive said lateral slides (24a, 24b).

6. An exhaust assembly according to claim 2, wherein said secondary exhaust nozzle (20) further comprises:

an annular shell (28) supported by said lateral slides (24a, 24b), said annular shell (28) being movable between a retracted position inside said fairing (2) and an extended position at least partially outside and in an extension of said fairing (2) as a function of an actuation of said second control mechanism (27a, 27b).

7. An exhaust assembly according to claim 3, wherein said secondary exhaust nozzle (20) further comprises:

an annular shell (28) supported by said lateral slides (24a, 24b), said annular shell (28) being movable between a retracted position inside said fairing (2) and an extended position at least partially outside and in an extension of said fairing (2) as a function of an actuation of said second control mechanism (27a, 27b).

8. An exhaust assembly according to claim 4, wherein said secondary exhaust nozzle (20) further comprises:

an annular shell (28) supported by said lateral slides (24a, 24b), said annular shell (28) being movable between a retracted position inside said fairing (2) and an extended position at least partially outside and in an extension of said fairing (2) as a function of an actuation of said second control mechanism (27a, 27b).

9. An exhaust assembly according to claim 5, wherein said secondary exhaust nozzle (20) further comprises:

an annular shell (28) supported by said lateral slides (24a, 24b), said annular shell (28) being movable between a retracted position inside said fairing (2) and an extended position at least partially outside and in an extension of said fairing (2) as a function of an actuation of said second control mechanism (27a, 27b).

10. An exhaust assembly according to claim 6, wherein said annular shell (28) supports said third control mechanism (29a, 29b).

11. An exhaust assembly according to claim 7, wherein said annular shell (28) supports said third control mechanism (29a, 29b).

12. An exhaust assembly according to claim 8, wherein said annular shell (28) supports said third control mechanism (29a, 29b).

13. An exhaust assembly according to claim 9, wherein said annular shell (28) supports said third control mechanism (29a, 29b).

14. An exhaust assembly according to claim 10, wherein said third control mechanism (29a, 29b) comprises at least one linear actuator.

15. An exhaust assembly according to claim 11, wherein said third control mechanism (29a, 29b) comprises at least one linear actuator.

16. An exhaust assembly according to claim 12, wherein said third control mechanism (29a, 29b) comprises at least one linear actuator.

17. An exhaust assembly according to claim 13, wherein said third control mechanism (29a, 29b) comprises at least one linear actuator.

18. An exhaust assembly according to claim 6, wherein said annular shell (28) comprises at least one scoop (30) which is arranged to guide a flow of cold air from outside said annular shell (28) into said secondary exhaust nozzle (20).

19. An exhaust assembly according to claim 10, wherein said annular shell (28) comprises at least one scoop (30) which is arranged to guide a flow of cold air from outside said annular shell (28) into said secondary exhaust nozzle (20).

20. An exhaust assembly according to claim 14, wherein said annular shell (28) comprises at least one scoop (30) which is arranged to guide a flow of cold air from outside said annular shell (28) into said secondary exhaust nozzle (20).

21. An exhaust assembly according to claim 1, wherein said primary exhaust nozzle (4) further comprises:

a pair of ventilated lateral plates (9a, 9b).

* * * * *